United States Patent Office 3,466,304
Patented Sept. 9, 1969

3,466,304
PREPARATION OF FURAN-SUBSTITUTED METHANOLS
Michael Elliott, Harpenden, and Norman Frank Janes, Luton, England, assignors to National Research Development Corporation, London, England, a British corporation
No Drawing. Filed Dec. 5, 1966, Ser. No. 598,901
Claims priority, application Great Britain, Aug. 23, 1966, 37,788/66
Int. Cl. C07d 5/20
U.S. Cl. 260—347.8        4 Claims

ABSTRACT OF THE DISCLOSURE

Alcohols of formula

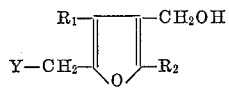

in which Y is hydrogen or lower alkyl, lower alkenyl or phenyl or phenyl substituted by lower alkyl, lower alkoxy or chlorine or a heterocyclic radical, for instance, furyl or furfuryl and $R_1$ and $R_2$ are hydrogen or lower alkyl, are prepared by cyclizing a compound of formula

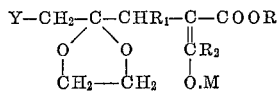

in which M is an alkali metal and R is hydrogen or lower alkyl in the presence of an acid. The product is a substituted furoic acid ester of formula

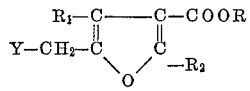

which is then reduced to the corresponding alcohol. The enol for the cyclization step is prepared by reaction of a gamma-ketoester for instance, from levulinic acid, with ethylene glycol to protect the keto group and then reacting the product with another ester, for instance, a formate or an acetate ester.

---

This invention relates to the preparation of certain furylmethyl alcohols which are useful as intermediates in the preparation of the insecticidal esters described and claimed in copending United States application Ser. No. 598,923. These alcohols are represented by the general formula:

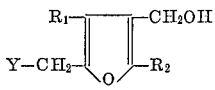

when Y represents a hydrogen atom or an alkyl, alkenyl or alkadienyl group or an aryl group or a heterocyclic group which themselves may be substituted by alkyl, alkenyl, alkadienyl or alkoxy groups or halogen atoms and $R_1$ and $R_2$, which may be the same or different, each represent a hydrogen atom or an alkyl, alkenyl or alkadienyl group.

Of the insecticidal esters described in United States application Serial No. 598,923 it has been found that amongst the most active are those derived from alcohols of the above formula in which $R_1$ and $R_2$ each represent a hydrogen atom and Y represents a phenyl group, i.e. 5-benzyl-3-furylmethyl alcohol and such an alcohol represents a preferred compound of the present invention. Other alcohols that are of interest include 5-benzyl-2-methyl-3-furylmethyl alcohol, 2-methyl-furyl-methyl alcohol, 5-methyl-3-furylmethyl alcohol, 2,5-dimethyl-3-furylmethyl alcohol, 5-(3-furylmethyl)-3-furylmethyl alcohol, 5-furfuryl-3-furylmethyl alcohol and 5-allyl-3-furylmethyl alcohol.

The alcohols of Formula V may be prepared by reducing the correspondingly substituted furoic acid or the carboalkoxy group in the correspondingly substituted 3-furoic acid ester. For example a metal hydride such as lithium aluminium hydride specifically reduces ester groups to hydroxymethyl groups under mild reaction conditions and is particularly useful in cases where other reducible groups are present in the molecule. This reduction proceeds at an acceptable rate at about room temperature or a little above in a low boiling organic solvent such as ether and the alcohol may be recovered in good yield in a sufficiently pure state for immediate esterification. Alternatively the carboalkoxy group may be hydrogenated catalytically.

A valuable synthesis has been devised for the preparation of the necessary 3-furoic acid ester intermediate and this is shown in the following reaction scheme:

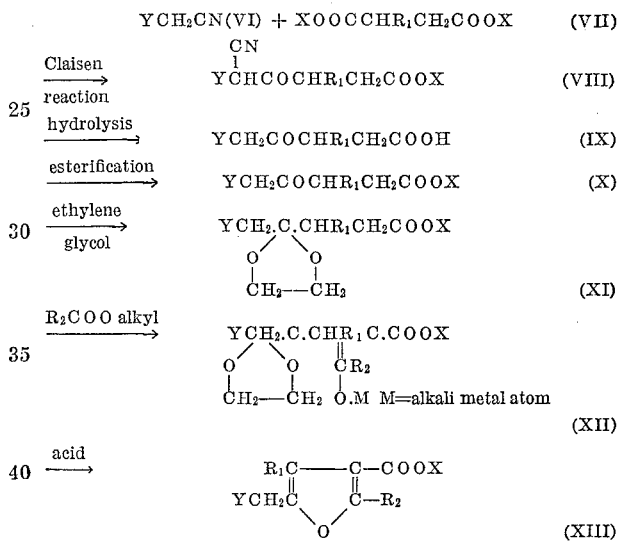

In this synthesis the cyano compound VI is condensed with an appropriate ester of succinic acid or succinic acid derivative VII under conditions of the Claisen reaction and the resulting cyano condensate VIII hydrolysed to give the β-keto acid which decarboxylates in situ. The hydrolysis conditions also convert the ester group to a carboxy group and the acid IX is re-esterified to the ester X. The keto group in ester X is then protected as the ethylenedioxy derivative XI and the resulting protected ester acylated with an ester $R_2COO$ alkyl e.g. methyl or ethyl formate or acetate to give compound XII. This acylation is one of the key steps in the synthesis and it is found that the acyl group can be introduced to give an intermediate stabilised in the form of an enol alkali metal salt. This enol salt can be readily cyclised under acid conditions to give the described furoic acid ester XIII.

Compounds XI, XII and XIII are new compounds.

In the case of 5-benzyl-3-furylmethyl alcohol benzyl cyanide is reacted with diethyl succinate in the presence of sodium ethoxide to give a δ-cyano-δ-phenyl levulinic acid ester intermediate which is then hydrolysed with mineral acid in the presence of sufficient acetic acid to maintain a complete solution. This hydrolysis converts the cyano group to a carboxy group which decarboxylates in situ as it is a β-keto acid. The ethyl ester group is hydrolysed to a carboxy group at the same time and this carboxy group is then reesterified in the next stage. If a final product with substituents in the phenyl ring is desired the necessary substitution could be made in the benzyl cyanide starting material where substitution would result in isomerically pure products. The re-esterified carboxy group is preferably re-esterified with a lower alcohol such as methanol or ethanol in the presence of an involatile reagent, preferably sulphuric acid.

In the next stage of the synthesis the keto group is protected by conversion to an ethylenedioxy group with ethylene glycol. This is found to be the preferred method to protect the keto group, rather than forming an acyclic ketal from a monohydric alcohol such as methyl or ethyl alcohol, or an enol ether, or making the enol lactone from the keto acid.

Some transesterification takes place at this stage when ethylene glycol esters of the levulinic acid are formed but this transesterification product can be recycled to the cyano hydrolysis step where they are converted to the levulinic acid again for re-use.

The protected keto ester can now be acylated with methyl or ethyl formate to introduce a formyl group which can be stabilised as a salt of the enol form. This acylation is carried out in the presence of sodium hydride or perhaps sodamide which participate in an irreversible reaction (hydrogen or ammonia being evolved) and so enable the acylated product to be obtained in high yield. The acylated product is normally isolated as a sodium salt of the enol form.

This sodium salt can now be cyclised in the presence of acid to give the ester of 5-benzyl-3-furoic acid. This ester is the ethyl ester where ethyl alcohol has been used in the esterification stage but other esters can be used equally well provided they can be readily reduced by lithium aluminium hydride. The ring closure proceeds at about room temperature or a little below preferably in the presence of aqueous acid to give the stable furoic acid ester which can be reduced in the final stage to the 3-furylmethyl alcohol.

The following example is given to illustrate the invention, temperatures are given in ° C.

EXAMPLE (a) δ-Phenyl levulinic acid)

Clean sodium (60 g.) is dissolved in dry ethanol (750 ml.) warming as necessary, the solution is then cooled nearly to room temperature and benzyl cyanide (234 ml.) and diethyl succinate (522 ml.) are stirred into the solution. This mixture is kept overnight at room temperature and then poured into 2 litres of iced water which is washed with two portions of benzene (500 ml.) to remove unreacted diethyl succinate and benzyl cyanide. The aqueous layer is acidified with about 500 ml. of dilute sulphuric acid and the precipitated oil run off, combined with an ether extract of the aqueous layer and washed with saturated sodium chloride solution, dried over sodium sulphate and evaporated to give 459 g. of the crude condensation product.

This residue is refluxed overnight with glacial acetic acid (2 litres) concentrated hydrochloric acid (660 ml.) and water (600 ml.). The mixture is then concentrated at reduced pressure and diluted with 1 litre of benzene which is washed with water (2×500 ml.) and concentrated to give δ-phenyl levulinic acid (325 g., 85% overall).

(b) Ethyl δ-phenyl levulinate

The acid (200 g.) from stage (a) is refluxed overnight with 5% w./v. sulphuric acid in ethanol (1.5 litres) and the volume of the mixture is then reduced pressure distillation at 50°. The residue is poured into saturated potassium bicarbonate solution (1 litre) which is extracted with ether (1 litre) and the ether extract washed, dried, and evaporated, and the residue distilled at reduced pressure, to give 199 g. of ethyl δ-phenyl levulinate (B.P. 134–136°/0.1 mm., $n_D^{20}$ 1.5002 to 1.5032; 199 g.; 87%).

The ethyl ester from stage (b) (200 g.) ethylene glycol (102 g., 1.65 mol) benzene (1 litre) and toluene 4-sulphonic acid (1 g.) is refluxed in a Dean and Stark apparatus until no more water separates. The solution is then washed with saturated sodium carbonate, saturated sodium chloride and dried, the solvent is evaporated and the residue distilled to give the ketal (195 g., 81% yield), B.P. 146–150°/0.1 mm. $n_D^{20}$ 1.5010. The residue from this distillation can be hydrolysed in good yield to δ-phenyllevulinic acid.

Sodium salt of ethyl α-hydroxymethylene-γ,γ-ethylene dioxy δ-phenyl levulinate

The ethylene ketal (26.4 g.) from stage (c), ethylformate (14.8 g.), a 50% dispersion of sodium hydride in oil (5.2 g.) and dry ether (400 ml. are stirred mechanically in dry apparatus and kept at room temperature for two to three days. The desired enol precipitates as sodium salt and is filtered off, washed with ether and dried in vacuo at room temperature, to give 23.5 g. (75% yield) of the sodium salt.

(e) Ethyl 5-benzyl-3-furoate

The sodium salt (5.5 g.) from stage (d) above is shaken with concentrated hydrochloric acid (600 ml.) first at −20° and then at room temperature for 4 hours; the product is extracted into ether, and ether washed with saturated sodium bicarbonate solution, saturated sodium chloride solution, dried and the solvent evaporated and the residue distilled to give 1.9 g. (41% yield) of ethyl 5-benzyl 3-furoate.

(f) 5-benzyl-3-furylmethyl alcohol

Ethyl 5-benzyl-3-furoate (23 g.) in dry ether (100 ml.) is added to a mixture of lithium aluminium hydride (4 g., 100% excess) in ether (200 ml.) with stirring at room temperature. After 16 hours the product is decomposed by addition of water and the ethereal layer washed with saturated sodium chloride and dried ($Na_2SO_4$). Evaporation and distillation of the residue gives 5-benzyl-3-furylmethyl alcohol B.P. 129–132°/1.0 mm., 12.1 g. (62%), identical in all respects with a sample prepared by reduction of methyl 5-benzyl-3-furoate.

Similarly prepared by lithium aluminium hydride reduction of the appropriate ester were:

|  | $n_D^{20}$ | B.P. (mm.) |
|---|---|---|
| 5-methyl-3-furylmethyl alcohol | 1.4797 | 84.85°/10 |
| 5-benzyl-2-methyl-3-furylmethyl alcohol | 1.5510 | 155–160°/0.1 |

We claim:
1. The process for the preparation of an alcohol of formula

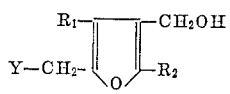

in which Y is hydrogen or lower alkyl, lower alkenyl or phenyl or phenyl substituted by lower alkyl, lower alkoxy or chlorine, $R_1$ and $R_2$ are the same or different and are hydrogen or lower alkyl, which comprises reacting an enol of formula

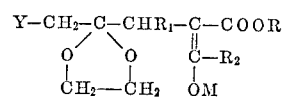

wherein M is an alkali metal, R is hydrogen or lower alkyl and $R_1$, $R_2$ and Y are as defined hereinabove, under conditions whereby cyclization occurs to give a furoic acid compound of formula

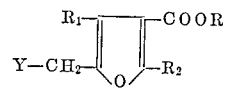

in which R, $R_1$, $R_2$ and Y are as defined above and then
(c) Ethyl γ,γ-ethylenedioxy-δ-phenyl-levulinate reducing the carboxyl group in the 3-position of said acid or ester to the hydroxymethyl group.

2. A process according to claim 1 in which said enol is cyclized in an acid medium.

3. A process according to claim 1 in which said enol is prepared by protecting the keto group of a ketoester of formula

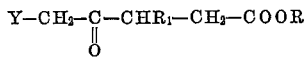

wherein R, $R_1$ and Y are as defined in claim 1, by reaction with ethylene oxide whereby a compound of formula

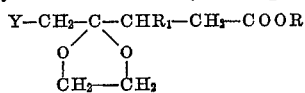

and then reacting with an acylating agent of formula

wherein $R_2$ is as defined in claim 1 in the presence of sodium hydride or sodamide.

4. The process for the preparation of 5-benzyl-3-furyl methyl alcohol which comprises reacting benzyl cyanide with diethyl succinate under conditions of the Claisen reaction whereby the compound of formula

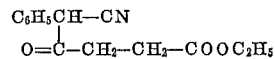

is obtained, hydrolyzing and decarboxylating the product to obtain δ-phenyllevulinic acid, esterifying the carboxyl group thereof, protecting the keto group in the gamma position by reaction with ethylene oxide, whereby the keto group is converted into the ethylenedioxy derivative, reacting said ethylenedioxy derivative with a lower alkyl formate in the presence of sodium hydride or sodamide, whereby a formyl group is introduced in the alpha position of said substituted levulinic acid derivative, cyclizing the product thus obtained by reaction with an acid to obtain a lower alkyl ester of 5-benzyl-3-furoic acid and reducing said ester group to the hydroxymethyl group.

References Cited

Dunlop and Peters—The Furans-Reinhold (1953), pp. 560–1.

ALEX MAZEL, Primary Examiner

BERNARD I. DENTZ, Assistant Examiner

U.S. Cl. X.R.

260—999